United States Patent
Thatte et al.

(10) Patent No.: US 9,534,502 B2
(45) Date of Patent: Jan. 3, 2017

(54) INDIVIDUALLY COMPLIANT SEGMENTS FOR SPLIT RING HYDRODYNAMIC FACE SEAL

(71) Applicant: General Electric Company, Schenectady, NY (US)

(72) Inventors: Azam Mihir Thatte, Arlington, MA (US); Karimulla Shaik Sha, Anantapur (IN); Rahul Anil Bidkar, Niskayuna, NY (US); Xiaoqing Zheng, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 426 days.

(21) Appl. No.: 14/226,583

(22) Filed: Mar. 26, 2014

(65) Prior Publication Data

US 2015/0275684 A1    Oct. 1, 2015

(51) Int. Cl.
*F01D 11/00* (2006.01)
*F01D 1/04* (2006.01)

(52) U.S. Cl.
CPC ............... *F01D 11/001* (2013.01); *F01D 1/04* (2013.01); *F01D 11/003* (2013.01); *F05D 2240/53* (2013.01); *Y02E 20/16* (2013.01)

(58) Field of Classification Search
CPC ........ F01D 1/04; F01D 11/001; F01D 11/003; F01D 11/005; F05D 2240/53; Y02E 20/16
See application file for complete search history.

(56) References Cited

U.S. PATENT DOCUMENTS

| | | | |
|---|---|---|---|
| 3,552,753 A * | 1/1971 | Mierley, Sr. | ......... F01D 11/005 277/632 |
| 4,212,475 A | 7/1980 | Sedy | |
| 4,421,321 A | 12/1983 | Lipschitz | |
| 4,576,384 A | 3/1986 | Azibert | |
| 4,738,453 A | 4/1988 | Ide | |
| 5,066,026 A | 11/1991 | Heck et al. | |
| 5,143,384 A | 9/1992 | Lipschitz | |
| 5,199,720 A | 4/1993 | Radosav et al. | |
| 5,385,409 A | 1/1995 | Ide | |
| 5,399,024 A | 3/1995 | Shapiro | |
| 5,496,047 A | 3/1996 | Goldswain | |
| 6,142,479 A | 11/2000 | Fedorovich | |
| 6,152,452 A | 11/2000 | Wang | |
| 6,390,477 B1 | 5/2002 | Drago et al. | |
| 6,446,976 B1 | 9/2002 | Key et al. | |
| 6,843,482 B1 | 1/2005 | Bayne | |
| 2002/0101038 A1 | 8/2002 | Budrow et al. | |

(Continued)

FOREIGN PATENT DOCUMENTS

WO        0020725        4/2000

*Primary Examiner* — Audrey K Bradley
(74) *Attorney, Agent, or Firm* — Ann M. Agosti

(57) ABSTRACT

Embodiments of the present disclosure are directed toward a face seal including a stator ring configured to be disposed about a rotor of a turbine, wherein stator ring comprises a first ring segment and a second ring segment configured to cooperatively form the stator ring, wherein the first and second ring segments are circumferentially split and have at least one bearing element disposed between the first and second ring segments, and wherein the at least one bearing element is configured to enable relative axial motion between the first and second ring segments at interfaces between the first and second ring segments.

17 Claims, 8 Drawing Sheets

(56) References Cited

U.S. PATENT DOCUMENTS

2007/0296160 A1 12/2007 Diantonio
2008/0247897 A1 10/2008 Guthrie
2009/0194950 A1 8/2009 Orlowski et al.
2011/0250056 A1 10/2011 Munson
2012/0261887 A1 10/2012 Vasagar

* cited by examiner

INDIVIDUALLY COMPLIANT SEGMENTS FOR SPLIT RING HYDRODYNAMIC FACE SEAL

CROSS-REFERENCE TO RELATED APPLICATION

This application is being filed concurrently with U.S. Non-Provisional application Ser. No. 14/226,617, entitled "FACE SEAL WITH LOCALLY COMPLIANT HYDRODYNAMIC PADS", filed Mar. 26, 2014, the disclosure of which is hereby incorporated by reference.

BACKGROUND

The subject matter disclosed herein relates to turbomachines, and, more particularly, to face seals for reducing or blocking flow leakage between various components of a turbomachine.

Turbomachines include compressors and/or turbines, such as gas turbines, steam turbines, and hydro turbines. Generally, turbomachines include a rotor, which may be a shaft or drum, which support turbomachine blades. For example, the turbomachine blades may be arranged in stages along the rotor of the turbomachine. The turbomachine may further include various seals to reduce or block flow (e.g., working fluid flow) leakage between various components of the turbomachine. For example, the turbomachine may include one or more face seals configured to reduce or block flow leakage between the shaft (e.g., rotating shaft) and a housing of the turbomachine. Unfortunately, traditional face seals may be difficult to assemble and/or may be susceptible to large face deformation that may result in premature wear or performance degradation.

BRIEF DESCRIPTION

In one embodiment, a system includes a steam turbine and a face seal of the steam turbine. The face seal of the steam turbine includes a rotor ring coupled to a rotor of the steam turbine, a stator ring coupled to a stationary housing of the steam turbine, wherein the stator ring is circumferentially split into a plurality of circumferential segments with one or more bearing elements disposed between each of the plurality of circumferential segments, wherein the one or more bearing elements are configured to enable axial movement of the plurality of segments relative to one another.

In another embodiment, a steam turbine includes a rotor, a stationary housing disposed about the rotor, and a face seal disposed about the rotor. The face seal includes a rotor ring coupled to or integral with the rotor and a stator ring coupled to the stationary housing. The stator ring includes a first segment, a second segment, and at least two bearing elements, wherein the first and second segments are circumferentially split, and the at least two bearing elements are disposed between the first and second segments, and wherein the first segment, the second segment, and the at least two bearing elements cooperatively form the stator ring.

In another embodiment, a system includes a stator ring configured to be disposed about a rotor of a turbine, wherein stator ring comprises a first ring segment and a second ring segment configured to cooperatively form the stator ring, wherein the first and second ring segments are circumferentially split and have at least one bearing element disposed between the first and second ring segments, and wherein the at least one bearing element is configured to enable relative axial motion between the first and second ring segments at interfaces between the first and second ring segments.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
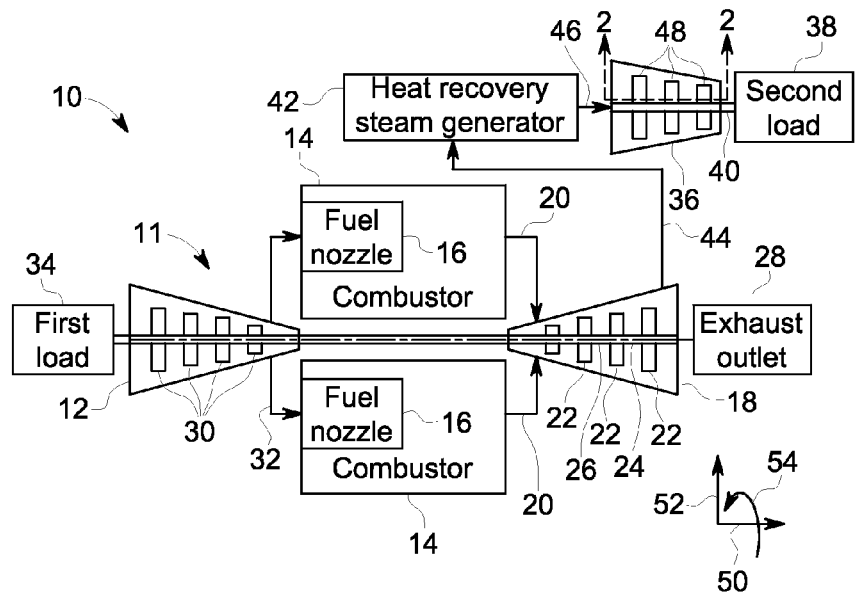
FIG. 1 is a schematic of an embodiment of a combined cycle power generation system having a gas turbine system, a steam turbine, and a heat recovery steam generation (HRSG) system.

Embodiments of the present disclosure are directed toward improved face seals having features configured to reduce leakage across the face seal and improve performance and longevity of the face seal. As will be appreciated, the face seal may include a primary ring (e.g., a stationary ring) which forms a sealing relationship or interface with a mating ring (e.g., a rotating ring). For example, the primary ring and the mating ring may be configured to reduce or block leakage of a working fluid across the face seal. In certain embodiments, the primary ring may have a split configuration with a bearing element, such as rolling interface. More specifically, the primary ring may include two or more segments which cooperatively form the primary ring, and the primary ring may include one or more rolling interfaces (e.g., bearing elements) between the two or more segments. For example, one or more pins or other rounded elements may be disposed between the two or more segments when the two or more segments are in abutment with one another. In the manner described below, the bearing element (e.g., rolling interface) between the two or more segments may enable low-friction relative movement (e.g., axial movement) between the two or more segments of the primary ring. In this way, each of the segments of the primary ring may achieve its own hydrodynamic equilibrium with respect to the mating (e.g., rotating) ring of the face seal. Furthermore, the rolling interfaces of the primary ring may be configured to absorb or support a radial pressure or load from each of the segments of the primary ring.

In certain embodiments, the primary ring of the face seal may include locally compliant hydrodynamic pads configured to engage with the mating ring. That is, each of the locally compliant hydrodynamic pads of the primary ring may be configured to form a separate sealing relationship with the mating ring. Specifically, each of the hydrodynamic pads may be individually biased toward the mating ring (e.g., by a spring coupled to the primary ring). In this way, each of the hydrodynamic pads can individually conform to the dynamically changing orientation of the mating ring, thereby improving the overall sealing interface and leak blockage between the primary ring and the mating ring. Additionally, the hydrodynamic pads may ensure that the segmented primary ring closes in toward the mating ring in a more uniform manner to avoid cocking or partial contacting between the primary ring and mating ring. Additionally, as described in detail below, each of the hydrodynamic pads may block direct contact between the primary ring and the mating ring while also reducing elevated leakage gaps.

It should be noted that in the following discussion, reference may be made to contact between various components of the face seal (e.g., primary ring, mating ring, hydrodynamic pads, etc.). However, it should be appreciated that reference to contact between such components may encompass very small gaps (e.g., 0.01-0.25 mm gaps) between such components, or parts of the components, rather than actual contact between such components.

Turning now to the drawings, FIG. 1 is a schematic block diagram of an embodiment of a conventional combined cycle system 10 having various turbomachines in which face seals of the present disclosure may be used. Specifically, the turbomachines may include face seals which may include a primary ring having a split configuration with rolling interfaces and/or a primary ring with locally compliant hydrodynamic pads. As shown, the combined cycle system 10 includes a gas turbine system 11 having a compressor 12, combustors 14 having fuel nozzles 16, and a gas turbine 18. The fuel nozzles 16 route a liquid fuel and/or gas fuel, such as natural gas or syngas, into the combustors 14. The combustors 14 ignite and combust a fuel-air mixture, and then pass hot pressurized combustion gases 20 (e.g., exhaust) into the gas turbine 18. The turbine blades 22 are coupled to a rotor 24, which is also coupled to several other components throughout the combined cycle system 10, as illustrated. For example, the turbine blades 22 may be arranged in stages. In other words, the turbine blades 22 may be circumferentially arranged about the rotor 24 at various axial locations of the rotor 24. As the combustion gases 20 pass through the turbine blades 22 in the gas turbine 18, the gas turbine 18 is driven into rotation, which causes the rotor 24 to rotate along a rotational axis 26. In certain embodiments, the gas turbine 18 may include face seals configured to reduce or block undesired leakage of the combustion gases 20 across rotor-stator gaps within the turbine. Eventually, the combustion gases 20 exit the gas turbine 18 via an exhaust outlet 28 (e.g., exhaust duct, exhaust stack, silencer, etc.).

In the illustrated embodiment, the compressor 12 includes compressor blades 30. The compressor blades 30 within the compressor 12 are also coupled to the rotor 24 and rotate as the rotor 24 is driven into rotation by the gas turbine 18 in the manner described above. As with the turbine blades 22, the compressor blades 30 may also be arranged in stages. As the compressor blades 30 rotate within the compressor 12, the compressor blades 30 compress air from an air intake into pressurized air 32, which is routed to the combustors 14, the fuel nozzles 16, and other portions of the combined cycle system 10. Additionally, the compressor 12 may include face seals configured to block undesired leakage of the pressurized air 32 across various rotor-stator gaps within a compressor.

The fuel nozzles 16 mix the pressurized air 32 and fuel to produce a suitable fuel-air mixture, which combusts in the combustors 14 to generate the combustion gases 20 to drive the turbine 18. Further, the rotor 24 may be coupled to a first load 34, which may be powered via rotation of the rotor 24. For example, the first load 34 may be any suitable device that may generate power via the rotational output of the combined cycle system 10, such as a power generation plant or an external mechanical load. For instance, the first load 34 may include an electrical generator, a propeller of an airplane, and so forth.

The system 10 also includes a steam turbine 36 for driving a second load 38 (e.g., via rotation of a shaft 40 of the steam turbine 36). For example, the second load 38 may be an electrical generator for generating electrical power. However, both the first and second loads 34 and 38 may be other types of loads capable of being driven by the gas turbine system 11 and the steam turbine 36. In addition, although the gas turbine system 11 and the steam turbine 36 drive separate loads (e.g., first and second loads 34 and 38) in the illustrated embodiment, the gas turbine system 11 and steam turbine 36 may also be utilized in tandem to drive a single load via a single shaft.

The system 10 further includes the heat recovery steam generator (HRSG) system 42. Heated exhaust gas 44 from the gas turbine 18 is transported into the HRSG system 42 to heat water to produce steam 46 used to power the steam turbine 36. As will be appreciated, the HRSG system 42 may include various economizers, condensers, evaporators, heaters, and so forth, to generate and heat the steam 46 used to power the steam turbine 36. The steam 46 produced by the HRSG system 42 passes through turbine blades 48 of the steam turbine 36. As similarly described above, the turbine blades 48 of the steam turbine 36 may be arranged in stages along the shaft 40, and the steam turbine 36 may include face seals to block undesired leakage of steam 46 across various rotor-stator gaps within the steam turbine 36. As the steam 46 pass through the turbine blades 48 in the steam turbine 36, the turbine blades 48 of the steam turbine 36 are driven into rotation, which causes the shaft 40 to rotate, thereby powering the second load 38.

In the following discussion, reference may be made to various directions or axes, such as an axial direction 50 along the axis 26, a radial direction 52 away from the axis 26, and a circumferential direction 54 around the axis 26 of the compressor 12, the gas turbine 18, or steam turbine 36.

Additionally, as mentioned above, while the face seals described below may be used with any of a variety of turbomachines (e.g., compressors 12, gas turbines 18, or steam turbines 36) the following discussion describes improved face seals in the context of the steam turbine 36.

Figure 2:
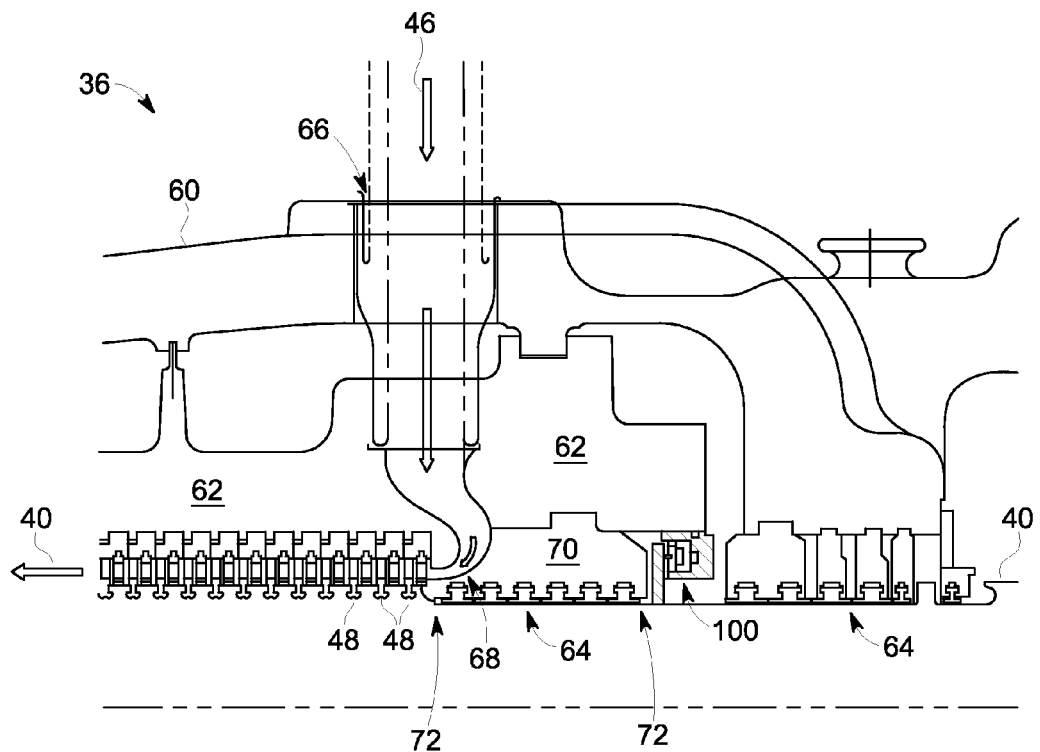
FIG. 2 is a partial cross-sectional view of an embodiment of a steam turbine, illustrating a face seal of the steam turbine.

FIG. 2 is a partial cross-sectional view of the steam turbine 36, illustrating a position of a face seal 100 within the steam turbine 36. As mentioned above, the steam turbine 36 may include one or more face seals 100 for reducing or blocking leakage of a working fluid (e.g., steam 46) across various rotor-stator gaps within the steam turbine 36.

In the illustrated embodiment, the steam turbine 36 includes a casing 60, an inner shell 62, and sealing components 64 disposed about the shaft 40 of the steam turbine 36. As shown, steam 46 enters the steam turbine 36 through an inlet 66 to an inlet side 68 of the steam turbine 36. As described above, the steam 46 may drive rotation of the turbine blades 48, thereby driving rotation of the shaft 40. As shown, some of the sealing components 64 form a tortuous path (e.g., a tortuous sealing path) between a stator component 70 of the steam turbine 36 and the shaft 40 of the steam turbine 36. As will be appreciated, although the steam 46 is directed towards the turbine blades 48 within the steam turbine 36, a portion of the steam 46 may leak through a leakage region 72 of the steam turbine 36, which may reduce the efficiency of the steam turbine 36. Accordingly, the steam turbine 36 also includes the face seal 100 to block or reduce steam 46 flow leakage within the steam turbine 36.

Figure 3:
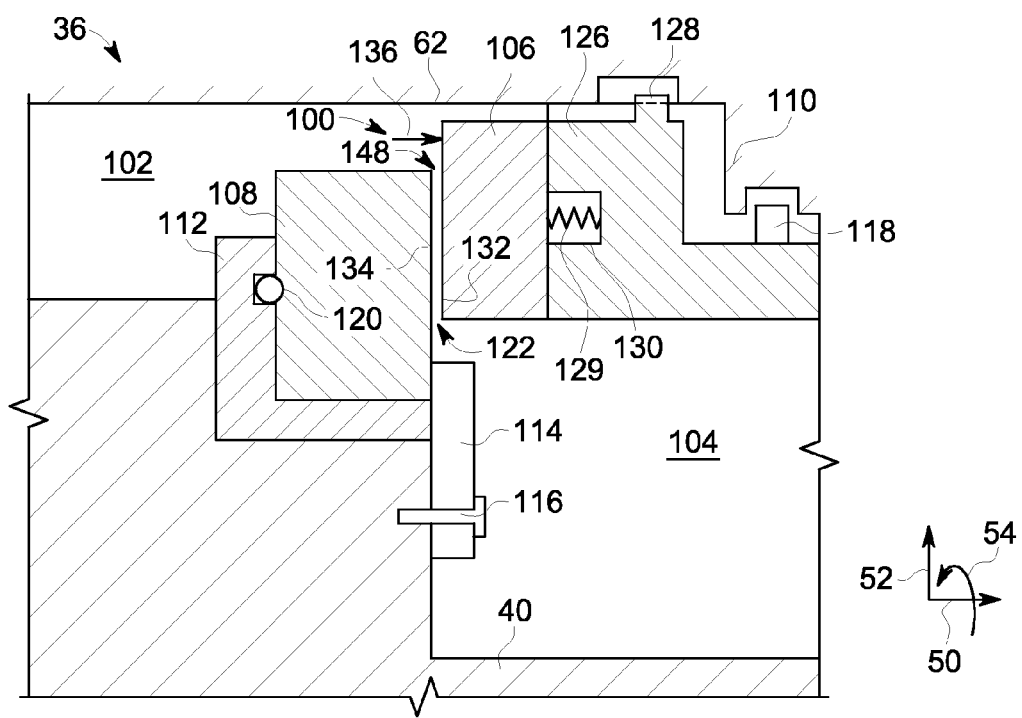
FIG. 3 is a partial cross-sectional view of a turbomachine, illustrating an embodiment of a face seal of the turbomachine.

FIG. 3 is a partial cross-sectional view of the steam turbine 36, illustrating an embodiment of the face seal 100, which is configured to block or reduce steam 46 flow leakage from a first region 102 (e.g., an upstream region) to a second region 104 (e.g., a downstream region) in the endpacking area. Specifically, the face seal 100 includes a primary ring 106 (a stationary ring) and a mating ring 108 (a rotor ring). The primary ring 106 is attached to the inner shell 62 of the steam turbine 36 and is moveable in the axial direction 50 only. For example, the primary ring 106 may be attached to a stationary housing 110 through a secondary seal 118 and anti-rotation feature 128. The mating ring 108 (rotor ring) may be an integral part of the shaft 40 (or rotor), or could be a service-friendly separated component coupled to the shaft 40. Furthermore, the mating ring 108 is secured to the shaft 40 of the steam turbine 36 through mechanical assembling. More specifically, the mating ring 108 is secured to the shaft 40 by a first retaining flange 112 and a second retaining flange 114. The first and second retaining flanges 112 and 114 cooperatively axially restrain the mating ring 108 to the shaft 40. For example, brazing, welding, mechanical fasteners (e.g., bolt 116), friction fits, threading, or other retaining mechanisms may be used to secure the mating ring 108 to the first and second retaining flanges 112 and 114 and secure the first and second retaining flanges 112 and 114 to the shaft 40. Bolt 116 tightens flange 114 against the shaft 40 and the flange 112, while preventing compression of and hence any tilting of rotating ring 108. As the shaft 40 is driving into rotation by the steam 46 flowing through the turbine blades 48, the mating ring 108 will also be driven into rotation.

Furthermore, the secondary seal 118 (e.g., an annular seal) is disposed between the primary ring 106 and the stationary housing 110. With the secondary seal 118 in place, leakage between the stationary housing 110 and primary ring 106 is limited, meanwhile allowing the primary seal ring 106 to move axially away or toward the rotating mating ring 108 (rotor ring) to accommodate any rotor 40 translation in axial direction 50 due to different thermal expansion of rotor 40 relative to stationary housing 110, or due to thrust reversal. The secondary seal 118 diameter, or conventionally called pressure-balance diameter, is selected to control primary ring 106 closing force. Similarly, a seal 120 is disposed between the mating ring 108 and the first retaining flange 112. The seals 118 and 120 are stationary seals. They may block leakage of steam 46 or other working fluid between the face seal 100 and the stationary housing 110 and shaft 40. As will be appreciated, in other embodiments, the face seal 100 may include other numbers or types of seals to block steam 46 or other working fluid flow between various components of the face seal 100 and the steam turbine 36.

As shown, the primary ring 106 and the mating ring 108 form a sealing interface 122. As mentioned above, the sealing interface 122 is configured to reduce or block leakage of steam 46 or other working fluid from the first region (high pressure region) 102 (e.g., an upstream region) to the second region 104 (low pressure region) (e.g., a downstream region) of the steam turbine 36. There is a backing portion 126, in which a spring 129 is disposed within a recess 130 and is coupled to the primary ring 106 and exerts an axial force on the primary ring 106. In this manner, the primary ring 106 may be biased toward the mating ring 108 of the face seal 100 to create the seal interface 122. Specifically, as the spring 129 exerts a biasing force on the primary ring 106, a face 132 of the primary ring 106 may be urged toward a face 134 of the mating ring 108. Additionally, while the embodiment shown in FIG. 3 illustrates one spring 129 disposed within one recess 130 of the backing portion 126, other embodiments may include multiple springs 129 disposed within respective recesses 130 about a circumference of the backing portion 126. Similarly, in other embodiments, each recess 130 may include multiple springs 129 configured to bias the primary ring 106 toward the mating ring 108.

As the mating ring 108 spins with respect to the primary ring 106, the hydrodynamic features (e.g., grooves or pads described in FIGS. 10-13) create a circumferential gradient in the film thickness (gap between primary ring 106 and mating ring 108) that generates hydrodynamic pressure at the interface (at faces 132, 134) and hence a separation force that keeps the face 132 from contacting face 134 during motion. This happens when the hydrodynamic opening force is larger than the net closing force created by external pressure acting on primary ring 106 and by the spring 129. By selecting the surface features (grooves, pads etc.) of the primary ring 106 and/or mating ring 108, dimensions of the primary and mating ring 106 and 108, and the spring 129 force, a desired equilibrium "riding" gap between the primary ring 106 and mating ring 108 can be obtained. The leakage volume of steam/gas is determined by the size of this equilibrium riding gap. If some additional force (e.g., a transient force due to thermal or pressure transients in operation) causes the mating ring 108 to move towards the primary ring 106, the gap decreases below the equilibrium value. This reduced gap causes an increase in the hydrodynamic force at the interface between the primary ring 106 and the mating ring 108. This increased hydrodynamic force resists the additional force (e.g., a transient force due to thermal or pressure transients in operation) and avoids contact between the primary ring 106 and the mating ring 108 that otherwise would have occurred due to the additional force. At this point, the dynamic equilibrium is regained at a slightly smaller gap between the primary ring 106 and the mating ring 108. On the other hand if the transient perturbations reduce the net closing force, then the hydrodynamic force drops below its original design value and the dynamic equilibrium is regained at a slightly larger gap between the primary ring 106 and the mating ring 108 compared to the original design value. Such a dynamic non-contact operation while maintaining an almost constant small gap allows the face seal 100 to operate without mechanical degradation while maintaining very small leakage. As will be appreciated, the surface features of the primary ring 106 and mating ring 108 responsible for creating hydrodynamic pressure distribution and hydrodynamic film stiffness (as well as dimensions and shape of the primary and mating ring 106 and 108 and the spring 129 responsible for creating closing force) can be selected so as to achieve a desired equilibrium riding gap size, and hence desired leakage characteristics and non-contact operation.

As discussed in detail below, in certain embodiments of the face seal 100, the primary ring 106 may have a split configuration. More particularly, the primary ring 106 may include two or more circumferentially split or divided segments that cooperatively form the primary ring 106. Additionally, the backing portion 126 may have a split configuration. Furthermore, a joint interface between two segments of the primary ring 106 may include a roller interface. As such, in the manner described below, the roller interfaces may enable relative axial movement between the two or more segments of the primary ring 106. In this way, face seal 100 performance may improve. For example, the relative axial movement between segments of the primary ring 106 may reduce or control undesired leakage gaps of the face seal 100, improve dynamic equilibrium of the face seal 100, and/or reduce mechanical wear and degradation of the various components of the face seal 100 during operation of the steam turbine 36. Furthermore, the split configuration of the primary ring 106 may enable the use of the face seal 100 with larger turbines (e.g., steam turbines 36) because the split configuration allows the face seal 100 to be assembled at a particular axial location directly instead of having to slide the face seal 100 from one end of the rotor (shaft) 40, which may not be possible in large diameter turbines. This is one of the major advantages offered by the individually compliant split ring design.

Figure 4:
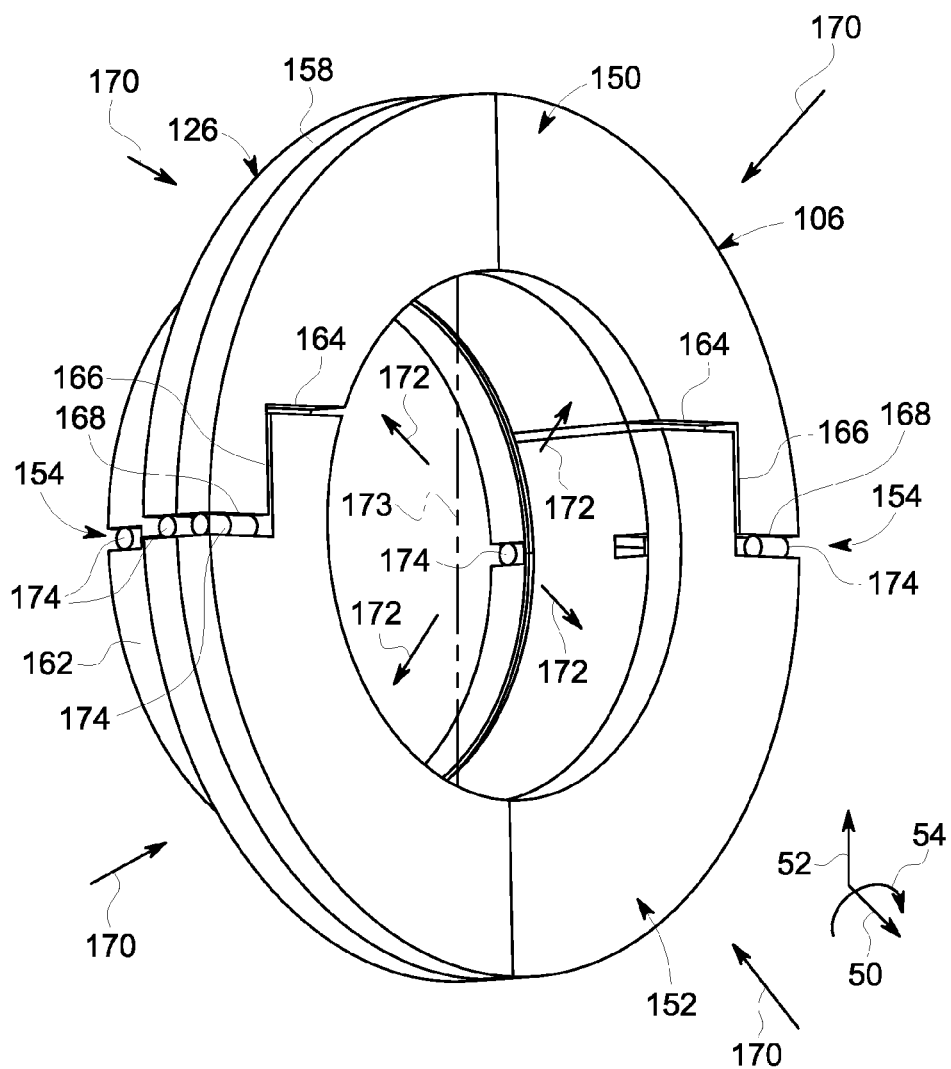
FIG. 4 is a perspective view of an embodiment of a primary sealing ring of the face seal, illustrating a split-ring configuration of the primary sealing ring.

FIG. 4 is a perspective view of the primary ring 106 of the face seal 100. In particular, the illustrated embodiment of the primary ring 106 has a split configuration. That is, the primary ring 106 is circumferentially split into multiple segments. Specifically, in the illustrated embodiment, the primary ring 106 includes a first segment 150 and a second segment 152, and the first and second segments 150 and 152 cooperatively form the primary ring 106. In other words, the first and second segments 150 and 152 join together to form the primary ring 106. In particular, the first and second segments 150 and 152 join at joint interfaces 154. As described in further detail below, the joint interfaces 154 are configured to enable relative axial movement of the first and second segments 150 and 152 of the primary ring 106 by including a rolling member at the joint interfaces 154. Additionally, while the illustrated embodiment includes the first and second segments 150 and 152, other embodiments may include other numbers of segments (e.g., 3, 4, 5, 6, or more) that are circumferentially split and cooperatively form the primary ring 106. Furthermore, in certain embodiments, the backing portion 126 may also have a segmented configuration. For example, in the illustrated embodiment, the first segment 150 of the primary ring 106 also includes a first segment 158 of the backing portion 126. Similarly, the second segment 152 of the primary ring 106 also includes a second segment 162 of the backing portion 126. However, in other embodiments, the backing portion 126 and the primary ring 106 may each have different numbers of segments.

As mentioned above, the first and second segments 150 and 152 abut one another at the joint interfaces 154 of the primary ring 106. The segment joint interface 154 features overlapped, stepped interfaces to reduce direct leaking path across the joint interface 154. As shown, each joint interface 154 includes a first joint face 164, a second joint face 166, and a roller joint face 168. In particular, the first joint face 164 and the roller joint face 168 of each joint interface 154 are circumferentially 54 offset from one another and generally extend in the radial 52 direction. Additionally, the second joint face 166 of each joint interface 154 extends between the first joint face 164 and the roller joint face 168 in the circumferential 54 direction. As such, each joint interface 154 has a generally L-shaped configuration. In other words, the first and second segments 150 and 152 of the primary ring 106 are split along generally L-shaped lines. For example, the first joint face 164 extending generally in the radial 52 direction and the second joint face 166 extending generally in the circumferential 54 direction join together to form an L-shape. Similarly, the second joint face 166 extending generally in the circumferential 54 direction and the roller joint face 168 extending generally in the radial 52 direction join together to form an L-shape. In the manner described below, this L-shaped configuration of the joint interfaces 154 between the first and second segments 150 and 152 of the primary ring 106 provides a sealing relationship between the first and second segments 150 and 152 while enabling relative axial movement between the first and second segments 150 and 152 when the primary ring 106 is assembled. The L-shaped configuration prevents leakage from the outer diameter of the primary ring 106 because any potential leakage along roller joint face 168 is blocked at the second (e.g., vertical) joint face 166. In other words, the L-shaped configuration creates a tortuous flow path to enable a reduction in leakage. Furthermore, along the first joint face 164, shims (e.g., thin metal shims) may be placed to further reduce any potential leakage.

As will be appreciated, during operation of the steam turbine 36, an outer diameter pressure (e.g., a radially inward pressure represented by arrows 170) of the primary ring 106 may be greater than an inner diameter pressure (e.g., a radially outward pressure represented by arrows 172) of the primary ring 106. Consequently, the primary ring 106 of the face seal 100 may experience a radially inward net pressure. Without a bearing element 174 (roller pins) on the interface 168 to absorb the inward loading, the radially inward net pressure acting on the primary seal 106 could cause the first and second segments 150 and 152 to be flush or abut one another at the first joint interface 164 and the second joint face 166 of each joint interface 154. Contact between those interfaces would prevent free relative axial movement between segments 150 and 152. Therefore, the first and second joint faces 164 and 166 are designed to have a minimal gap while the radially inward net pressure load is carried by the roller pins (e.g., the bearing elements 174) on the interface 168. In certain embodiments, the first and second segments 150 and 152 may be manufactured to have tight tolerances at the first and second joint faces 164 and 166 to minimize the gap and improve the sealing of the joint interfaces 154. Additionally or alternatively, the joint interfaces 154 may include seal strips disposed in the first joint faces 164 to improve sealing of the joint interfaces 154. The sealing between the first and second joint faces 164 and 166 helps block undesired leakage of steam 46 or other working fluid across segment joints of the face seal 100. Furthermore, in the illustrated embodiment, the symmetrical orientation of the joint interfaces 154 (e.g., first and second joint faces 164 and 166) about a vertical axis 173 of the primary ring 106 reduces lateral pressure imbalance.

As mentioned above, the joint interfaces 154 of the primary ring 106 each include the roller joint face 168. More specifically, each of the roller joint faces 168 includes one or more roller pins 174 disposed between the first and second segments 150 and 152. The cylindrical shape of the roller pins 174 enable the roller joint faces 168 to carry or transfer the radially inward net pressure acting on the primary ring 106 while still enabling the first and second segments 150 and 152 of the primary ring 106 to axially (e.g., in the direction 50) move relative to one another. In this manner, each of the first and second segments 150 and 152 may achieve its own hydrodynamic equilibrium with respect to the mating ring 108 during operation of the steam turbine 36. More specifically, as the first and second segments 150 and 152 are free to move axially independently of one another, any relative tilt between the first and second segments 150 and 152 would be corrected by corresponding hydrodynamic pressures on the first and second segments 150 and 152 (e.g., larger hydrodynamic pressures on the segment that is closer to the mating ring 108 compared to the other segment). The self-correcting hydrodynamic pressure may cause the segments to move axially relative to the other segment until a dynamic equilibrium is re-gained. As a result, the first and second segments 150 and 152 may operate or "ride" at their respective equilibrium positions with respect to the mating ring 108 while reducing the occurrence of rubbing between the first and second segments 150 and 152 and the mating ring 108. In this manner, mechanical degradation of the face seal 100 may be reduced, face seal 100 life span may be improved, and maintenance may be reduced.

Figure 5:
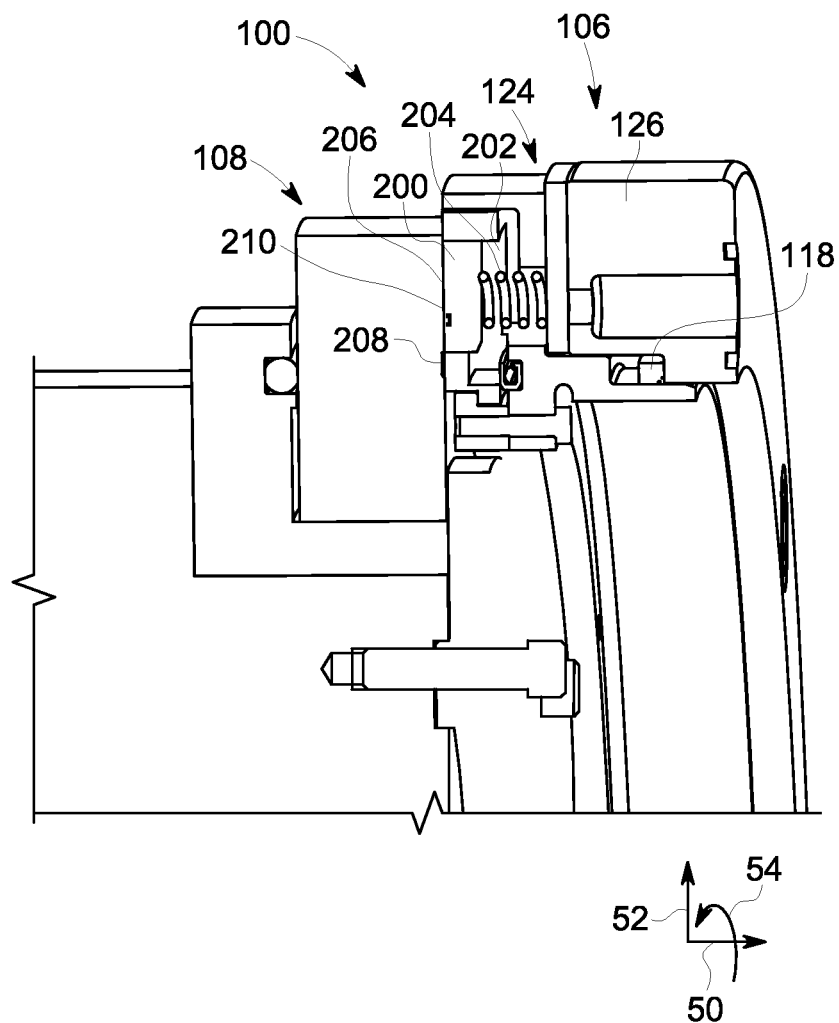
FIG. 5 is a partial cross-sectional view of a turbomachine, illustrating an embodiment of a face seal of the turbomachine.

FIG. 5 is a partial cross-sectional view of an embodiment of the face seal 100, illustrating the primary ring 106 having locally compliant hydrodynamic pads 200. Specifically, the locally compliant hydrodynamic pads 200 are disposed in and adjacent the primary ring 106 facing the mating ring 108 of the face seal 100. That is, the illustrated locally compliant hydrodynamic pad 200 is disposed within a pocket or recess 202 of the primary ring 106. Additionally, the hydrodynamic pads 200 may each be biased towards the mating ring 108 by one or more springs 204 (e.g., coil spring). As a result, the hydrodynamic pads 200 are configured to engage with the mating ring 108. One of the functions of the locally compliant hydrodynamic pad 200 is to engage the mating ring 108 before the majority of the primary ring face 132 comes close to the mating ring face 134. The locally compliant hydrodynamic pad 200 also helps align the primary ring 106 properly with the mating ring 108. Furthermore, in certain embodiments, each of the hydrodynamic pads 200 may have a micron length-scale profile (e.g., on axial face 206 of the hydrodynamic pad 200) with axial groove depth variations in the circumferential direction 54 of each hydrodynamic pad 200 and/or in the radial direction 52 of each hydrodynamic pad 200 to generate a specific profile of hydrodynamic pressure on each hydrodynamic pad 200 to help the face seal 100 maintain non-contact operation. Similarly, it should be noted that primary ring sealing face 208 and/or the mating ring sealing face 210 of may also have various profiles or surface features to improve hydrodynamic load-bearing performance of the face seal 100, as discussed in detail below.

As mentioned, the spring 204 is disposed within the respective pocket or recess 202 of the primary ring 106. That is, the recess 202 is formed in the primary ring 106 that faces the mating ring 108 of the face seal 100 when the face seal 100 is assembled. As will be appreciated, the spring 204 is designed to allow certain degrees of freedom for the hydrodynamic pad 200. For example, the spring 204 may allow a first translational degree of freedom in an out of the plane of the primary ring 106 (e.g., movement in the axial direction 50), a second rotating degree of freedom rocking or pivoting in the circumferential direction 54, and a third rotating degree of freedom rocking or pivoting in the radial direction 52. Therefore, the hydrodynamic pad 200 may better conform to the mating ring 108 orientations and/or distortions. As a result, the hydrodynamic pad 200 may block contact between the primary ring 106 and the mating ring 108, while also blocking the formation of large leakage gaps between the primary ring 106 and the mating ring 108 of the face seal 100. In other words, the hydrodynamic pad 200 enables the primary ring 106 to maintain a "hydrodynamically locked in" position with respect to the mating ring 108. A local closing force facilitated by individual pocket spring 204 and a local hydrodynamic opening force facilitated by individual pad 200 help the primary ring 106 perform with precision so as to achieve a dynamic equilibrium with respect to the mating ring 108 without contacting the mating ring 108. This can help prevent or reduce rubs when the operating forces are trying to form a wedge shaped gap between the primary ring 106 and mating ring 108. During such an event, the pads 200 on the primary ring 106 that are closer to the mating ring 108 will tend to generate a larger hydrodynamic opening force and will compress corresponding local springs 204 farther into the backing portion 126 compared to the pads 200 that are away from the mating ring 108. This radial difference in opening force will create a nutation of the primary ring 106 and will try to make the wedge shaped gap parallel. The ability of the face seal 100 to ride with such a parallel gap reduces the possibility of rubbing. In this manner, rubbing and mechanical degradation between the primary ring 106 and mating ring 108 may be reduced while still maintaining the leakage of steam 46 to a very low designed value. As will be appreciated, a reduction in mechanical degradation of components of the face seal 100 may reduce steam turbine 36 down time and maintenance costs and may increase the useful life of the face seal 100 components, while a reduction of steam 46 leakage may improve efficiency of the steam turbine 36.

As mentioned above, the axial face 206 of each hydrodynamic pad 200 may have various profiles to improve operation of the face seal 100. For example, the face 206 of one or more hydrodynamic pads 200 may have a converging profile in the direction of rotation (e.g., in the circumferential direction 54) to enable hydrodynamic force generation as the mating ring 108 spins past them in one direction (e.g. clockwise). In other embodiment pads 200 can have a wavy profile to enable bi-directional operation of the steam turbine 36. In another embodiment, the face 206 of one or more hydrodynamic pads 200 may have a step in the radial direction 52 that forms a dam section against radially 52 inward flow of steam 46 to generate an additional dynamic pressure component (due to flow impingement) that will improve hydrodynamic pressure distribution. Such features may help reduce tolerance demand or requirements of various face seal 100 components. It should be noted that the sealing face 208 of the primary ring 106 and the sealing face 210 of the mating ring 108 may also have various profiles or surface features to improve hydrodynamic load-bearing performance of the face seal 100.

Furthermore, the number of springs 204 biasing each hydrodynamic pad 200 and the position of the springs 204 relative to the respective hydrodynamic pad 200 may vary in different embodiments. For example, in the illustrated embodiment, the hydrodynamic pad 200 is biased toward the mating ring 108 by one spring 204 that is generally coupled to a center of the hydrodynamic pad 200. In other embodiments, each hydrodynamic pad 200 may have multiple springs 204 biasing the hydrodynamic pad 200 toward the mating ring 108. For example, each hydrodynamic pad 200 may be biased toward the mating ring 108 by four springs 204 with one spring 204 coupled to a respective corner of the hydrodynamic pad 200 (see FIG. 8). For further example, in certain embodiments, each hydrodynamic pad 200 may include one spring 204 coupled to the hydrodynamic pad 200 offset from the center (e.g., radially 52 inward or radially 52 outward) of the hydrodynamic pad 200. Leaf springs could be used instead of the coil springs shown.

Figure 6:
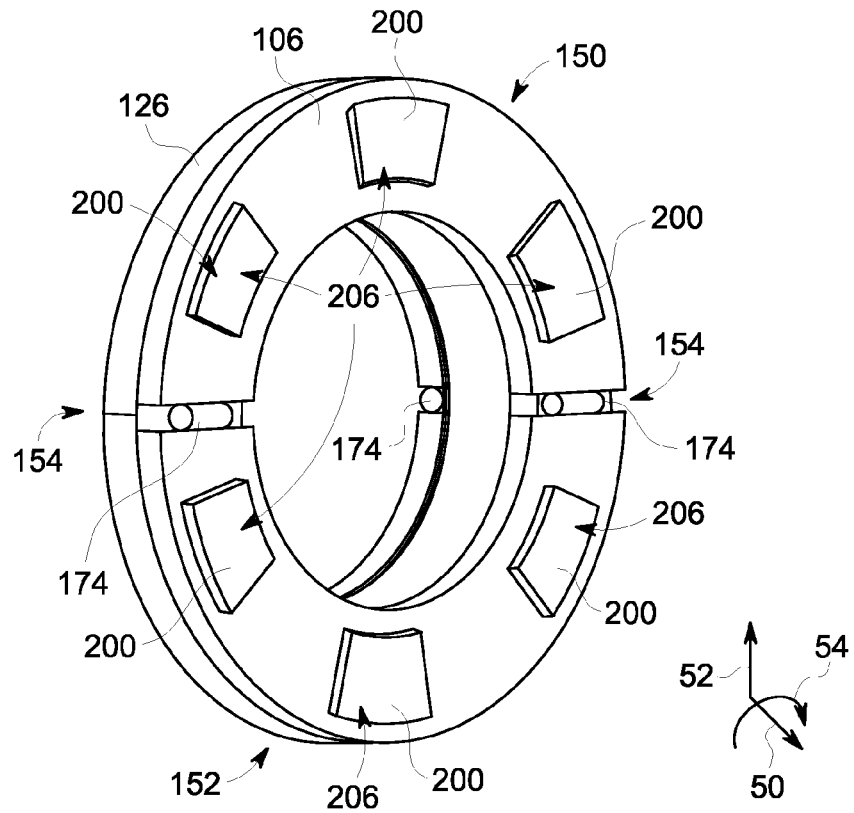
FIG. 6 is a perspective view of an embodiment of a primary sealing ring of the face seal, illustrating locally compliant sealing pads of the primary sealing ring.
Figure 7:
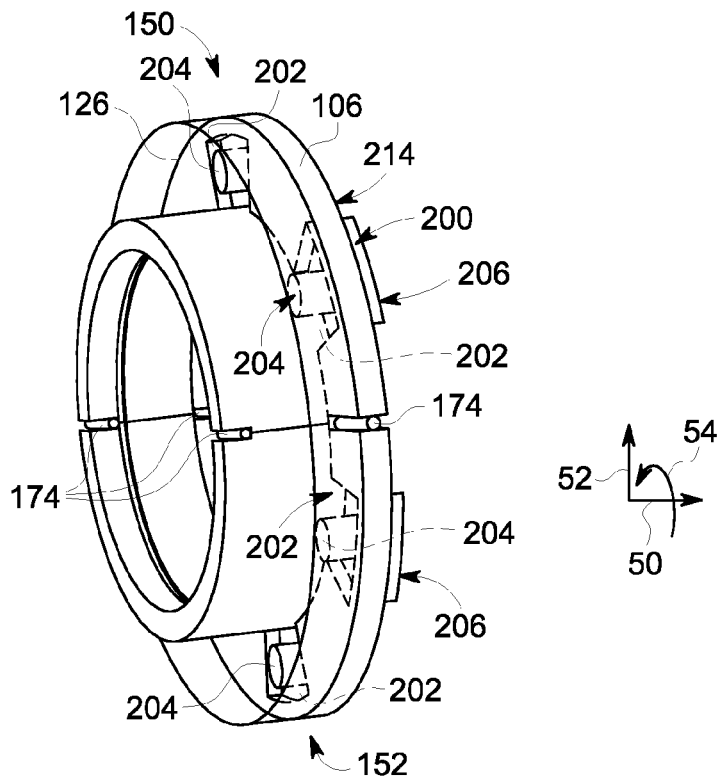
FIG. 7 is a perspective view of an embodiment of a primary sealing ring of the face seal, illustrating locally compliant sealing pads of the primary sealing ring.

FIGS. 6 and 7 are perspective views of an embodiment of the primary ring 106 of the face seal 100, illustrating locally compliant hydrodynamic pads 200 of the primary ring 106. As mentioned above, each of the locally compliant hydrodynamic pads 200 may be supported by one or more springs 204. As a result, each of the hydrodynamic pads 200 can move individually (e.g., irrespective of other hydrodynamic pads 200) in and out of the plane of the primary ring 106. In this manner, each of the hydrodynamic pads 200 may conform to the dynamically changing orientation of the mating ring 108 arising from thermal, pressure-driven, and/or transient forces.

In the illustrated embodiment, the primary ring 106 includes six locally compliant hydrodynamic pads 200 spaced substantially equidistantly about the primary ring 106 in the circumferential direction 54. However, in other embodiments, the primary ring 106 may include other numbers of hydrodynamic pads 200 and/or hydrodynamic pads 200 arranged in other configurations, as discussed below. For example, in the illustrated embodiment, the hydrodynamic pads 200 have substantially similar positions along the primary ring 106 in the radial direction 52. However, in other embodiments, the hydrodynamic pads 200 may be radially 52 staggered. For example, one hydrodynamic pad 200 may have a first radial 52 position, and adjacent hydrodynamic pads 200 may have a second radial 52 position, thereby creating a staggered arrangement circumferentially 54 around the primary ring 106.

Furthermore, the illustrated embodiment of the primary ring 106 includes the first and second segments 150 and 152, as similarly described above with respect to FIG. 4. Additionally, the joint interfaces 154 of the primary ring 106 include the roller pins 174 to enable relative axial 50 movement of the first and second segments. However, it should be noted that other embodiments of the primary ring 106 may include the locally compliant hydrodynamic pads 200 but not a segmented configuration. Similarly, in other embodiments, the primary ring 106 may include a segmented configuration but not the locally compliant hydrodynamic pads 200 described above.

Figure 8:
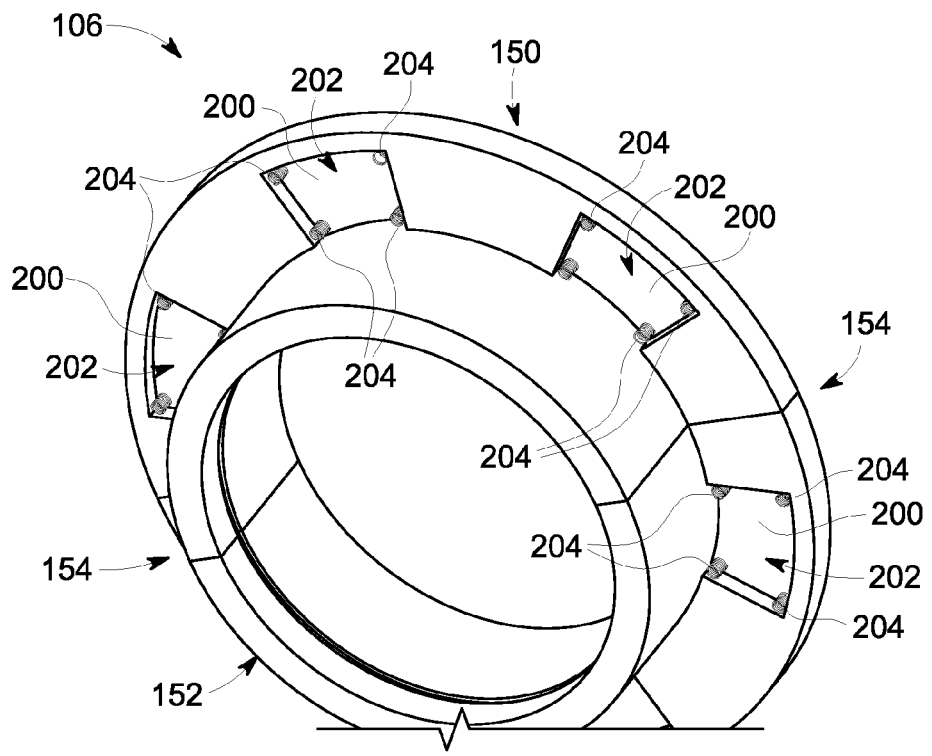
FIG. 8 is a perspective view of an embodiment of a primary sealing ring of the face seal, illustrating locally compliant sealing pads of the primary sealing ring.
Figure 9:
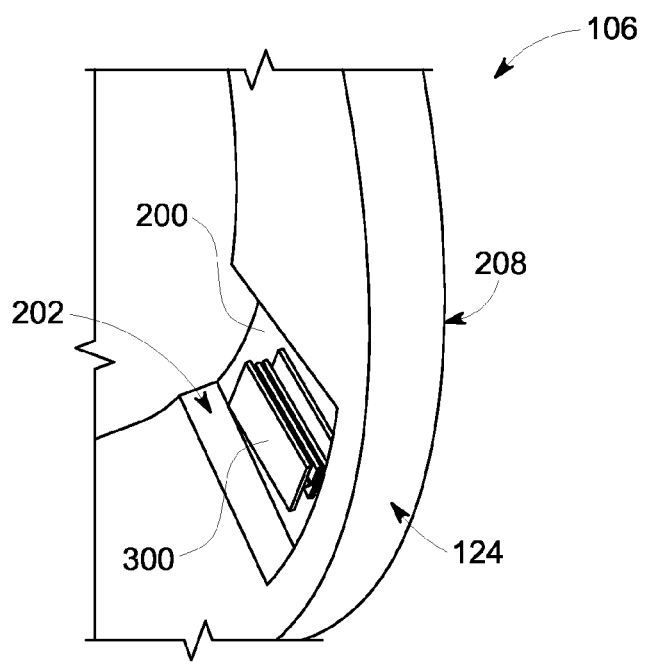
FIG. 9 is a partial perspective view of an embodiment of a primary sealing ring of the face seal, illustrating a spring biasing a locally compliant sealing pad of the primary sealing ring.

FIGS. 8 and 9 are perspective views of other embodiments of the primary ring 106 of the face seal 100, illustrating locally compliant hydrodynamic pads 200 of the primary ring 106. Specifically, FIG. 8 illustrates the primary ring 106 having locally compliant hydrodynamic pads 200, where each locally compliant hydrodynamic pad 200 is biased toward the mating ring 108 by four springs 204 within the respective recess 202 cut through the face of the primary ring 106. As shown, each recess 202 includes one spring 204 in each of the four corners of the recess 202. Such an arrangement provides the ability to tune the spring 204 stiffness at the four corners of the pad 200 individually so as to provide desired moment characteristics to correct for any tilt bias in the primary ring 106. For example, by increasing the stiffness of the springs 204 at the top corners, one can make area near the outer diameter of the pad 200 less compliant with respect to the inner diameter, thus causing fluid film thickness locally higher at the inner diameter of the pad 200 than at the outer diameter so as to compensate for any tilt-producing operational phenomenon that causes inner diameter film thickness to be lower than the outer diameter film thickness. In the illustrated embodiment, the springs 204 are coil springs, however, in other embodiments, the springs 204 may be other types of springs, such as leaf spring or beams. FIG. 9 illustrates an embodiment of the primary ring 106 having locally compliant hydrodynamic seals 200, where each of the locally complaint hydrodynamic seals 200 are biased by a respective bellow spring 300 disposed within the respective recess 202 of the primary ring 106. By selecting the thickness of the bellows, spacing between bellow turns and number of turns, one can achieve the desired force and structural moment characteristics of compliant mechanism of the pad to resist any aerodynamic moments (e.g. due to windage) that are trying to de-stabilize the hydrodynamic performance of the seal. While each locally complaint hydrodynamic seal 200 is biased by one bellow spring 300 in the illustrate embodiment, other embodiments may include other numbers of bellow springs 300.

Figure 10:
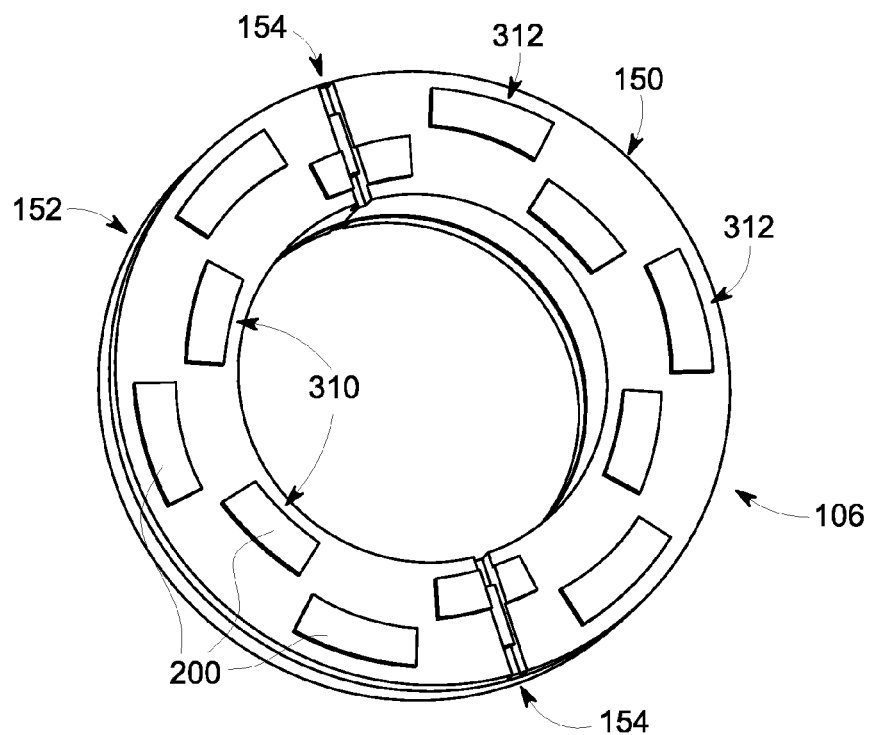
FIG. 10 is a perspective view of an embodiment of a primary sealing ring of the face seal, illustrating an arrangement of locally compliant sealing pads of the primary sealing ring.
Figure 11:
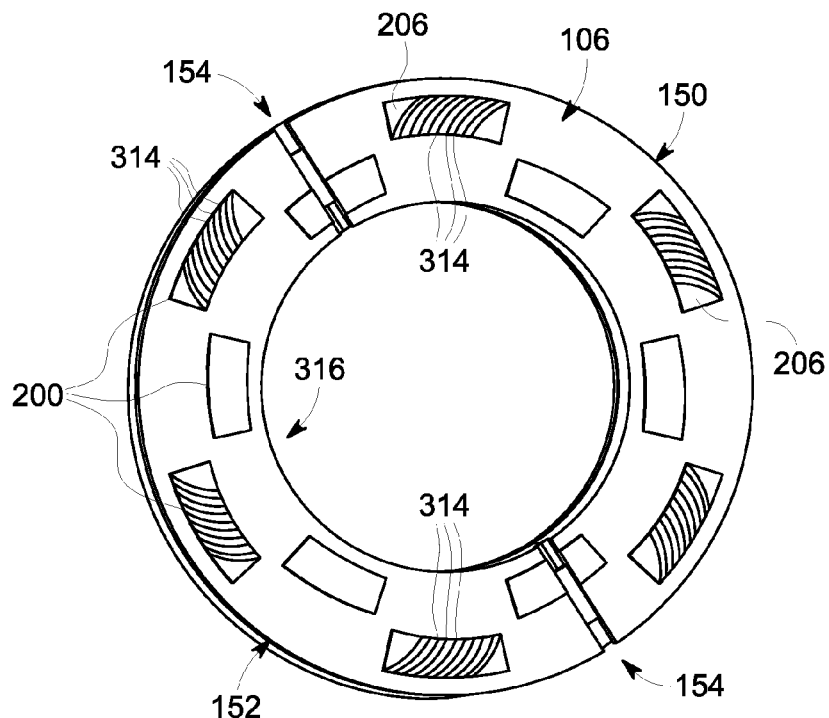
FIG. 11 is a perspective view of an embodiment of a primary sealing ring of the face seal, illustrating an arrangement of locally compliant sealing pads of the primary sealing ring.

FIGS. 10 and 11 are perspective views of other embodiments of the primary ring 106 of the face seal 100, illustrating another arrangement of the locally compliant hydrodynamic pads 200 of the primary ring 106. Specifically, in FIGS. 10 and 11, the primary ring 106 includes a first, radially inward set 310 of locally compliant hydrodynamic pads 200, and a second, radially outward set 312 of locally compliant hydrodynamic pads 200. Additionally, the first, radially inward set 310 and the second, radially outward set 312 of locally compliant hydrodynamic pads are staggered circumferentially 54 about the primary ring 106 with respect to one another. However, in other embodiments, the first, radially inward set 310 and the second, radially outward set 312 may not be circumferentially staggered relative to one another. Additionally, as will be appreciated, the first, radially inward set 310 and the second, radially outward set 312 may have the same or different numbers of locally compliant hydrodynamic pads 200. Furthermore, in FIG. 11, each of the second, radially outward set 312 of locally compliant hydrodynamic pads 200 includes a surface treatment 314. Specifically, each of the second, radially outward set 312 of locally compliant hydrodynamic pads 200 includes a micron length-scale profile or grooves 314 on the respective face 206 of each hydrodynamic pad 200. As will be appreciated, the micro-scale profile or grooves 314 on the respective face 206 of each hydrodynamic pad 200 may generate additional pressure towards an inner diameter 316 of the primary ring 106, thus providing additional hydrodynamic separation force to keep the primary ring 106 from contacting the mating ring 108.

Figure 12:
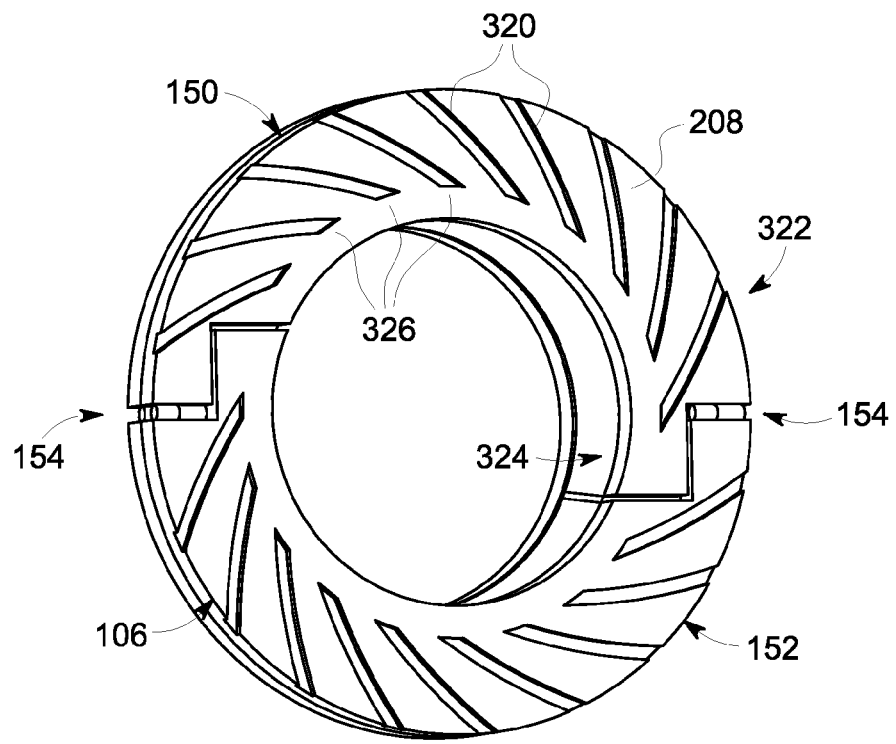
FIG. 12 is a perspective view of an embodiment of a primary sealing ring of the face seal, illustrating a surface feature of the primary sealing ring.
Figure 13:
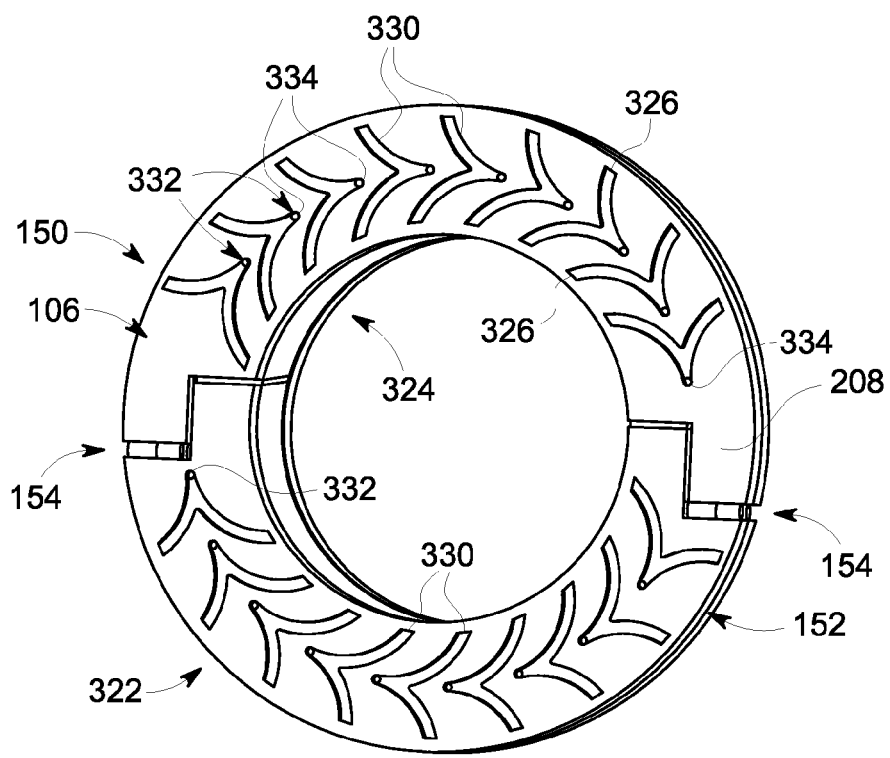
FIG. 13 is a perspective view of an embodiment of a primary sealing ring of the face seal, illustrating a surface feature of the primary sealing ring.

FIGS. 12 and 13 are perspective views of other embodiments of the primary ring 106 of the face seal 100, illustrating various surface treatments or features formed on the sealing face 208 of the primary ring 106. For example, in FIG. 12, the sealing face 208 of the primary ring 106 includes grooves 320 (e.g., spiral grooves), which extend from an outer diameter 322 toward an inner diameter 324 of the sealing face 208. As will be appreciated, the grooves 320 may be recesses formed in the sealing face 208 that extend toward, but not all the way to, the inner diameter 324 of the sealing face 208. Rather, each groove 320 has a dam portion 326. As such, steam 46 or other gas may enter the grooves 320 from the outer diameter side during operation of the steam turbine 36 and flow through the grooves, accelerating along the curvature of the grooves, towards the dam portion 326 of each groove 320 and finally impinges against the dam portion 326, thus creating a dynamic pressure rise so as to provide the hydrodynamic separation force. In this manner, the grooves 320 may enable the generation of additional pressure toward the inner diameter 324 of the primary ring 106. In FIG. 13, the sealing face 208 of the primary ring 106 includes Y-shaped grooves 330. As shown, each Y-shaped groove 330 extends from the middle of sealing face 208 toward both outer diameter 322 and the inner diameter 324 starting from a stem portion 332 to form a Y-shaped groove 330 which is terminated before reaching the inner and outer diameters. As steam 46 or other gas is fed into the Y-shaped grooves 330 through hole 334. The Y-shaped grooves 330 pumps fluid toward both outer diameter 322 and the inner diameter 324 simultaneously to generate hydrodynamic pressure in the regions near the outer or inner diameters 322 or 324 of the primary ring 106. With such a Y shaped configuration of the grooves, the outer branch and inner branch of the Y shape provide the self-correcting hydrodynamic forces needed to follow any coning of the mating ring sealing face 210.

As will be appreciated, each of the features (e.g., surface treatments and/or profiles) of the embodiments discussed above may be included individually or in any combination with one another as a part of one or more of the different components of the face seal 100. For example, the hydrodynamic features shown on the primary sealing face 208 in FIGS. 12 and 13 can be applied to the mating ring sealing face 210 while the primary sealing face 208 is a blank flat surface. Additionally, one of ordinary skill in the art will appreciate that the various arrangements, surface treatments, and other features discussed above may have other configurations, which are considered within the scope of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a steam turbine; and
a face seal of the steam turbine, comprising:
a rotor ring coupled to a rotor of the steam turbine; and
a stator ring coupled to a stationary housing of the steam turbine, wherein the stator ring is circumferentially split into a plurality of circumferential segments with one or more bearing elements disposed between each of the plurality of circumferential segments, wherein the one or more bearing elements are configured to enable relative axial movement of the plurality of segments relative to one another,
wherein the plurality of circumferential segments comprises a first circumferential segment and a second circumferential segment, and the first and second circumferential segments cooperatively form the stator ring via overlapping joint interfaces having the one or more bearing elements.

2. The system of claim 1, wherein the stator ring comprises a backing portion coupled to the stationary housing, and the stator ring is configured to hydrodynamically engage with the rotor ring.

3. The system of claim 2, wherein the stator ring is biased toward the rotor ring by a spring extending between the backing portion and the stator ring.

4. The system of claim 1, wherein the overlapping joint interfaces comprise two L-shaped joint interfaces.

5. The system of claim 4, wherein the two L-shaped joint interfaces are symmetric with respect to one another about a vertical axis of the stator ring.

6. The system of claim 4, wherein each of the L-shaped joint interfaces comprises a first joint face, a second joint face, and a roller joint face, wherein the first joint face and the roller joint face are generally parallel with one another, and wherein the second joint face is generally perpendicular to the first joint face and the roller joint face.

7. The system of claim 6, wherein the second joint face extends between the first joint face and the roller joint face.

8. The system of claim 6, wherein the one or more bearing elements comprises two roller pins, and each roller joint face comprises one of the two roller pins.

9. The system of claim 6, wherein the first and second circumferential segments are configured to contact one another at the second joint face.

10. A system, comprising:
a stator ring configured to be disposed about a rotor of a turbine, wherein the stator ring comprises a first ring segment and a second ring segment configured to cooperatively form the stator ring, wherein the first and second ring segments are circumferentially split and have at least one bearing element disposed between the first and second ring segments, and wherein the at least one bearing element is configured to enable relative axial motion between the first and second ring segments at interfaces between the first and second ring segments, wherein the interfaces comprise L-shaped interfaces.

11. The system of claim 10, wherein the at least one bearing element comprises a roller pin.

12. The system of claim 10, wherein the stator ring is configured to hydrodynamically engage with a rotor ring disposed about the rotor of the turbine.

13. A turbine, comprising:
a rotor;
a stationary housing disposed about the rotor; and
a face seal disposed about the rotor, comprising:
a rotor ring coupled to or integral with the rotor; and
a stator ring coupled to the stationary housing, wherein the stator ring comprises:
a first segment;
a second segment; and
at least two bearing elements, wherein the first and second segments are circumferentially split, and the at least two bearing elements are disposed between the first and second segments, and wherein the first segment, the second segment, and the at least two bearing elements cooperatively form the stator ring, wherein the first and second segments abut and support one another at two joint interfaces, wherein each of the joint interfaces comprises at least two joint faces generally perpendicular to one another.

14. The turbine of claim 13, wherein the first segment and the second segment each comprise a backing portion coupled to the stationary housing and a primary ring portion.

15. The turbine of claim 13, wherein the at least two bearing elements comprise two cylindrical roller pins.

16. A turbine, comprising:
a rotor;
a stationary housing disposed about the rotor; and
a face seal disposed about the rotor, comprising:
  a rotor ring coupled to or integral with the rotor; and
  a stator ring coupled to the stationary housing, wherein the stator ring comprises:
    a first segment;
    a second segment; and
    at least two bearing elements, wherein the first and second segments are circumferentially split, and the at least two bearing elements are disposed between the first and second segments, and wherein the first segment, the second segment, and the at least two bearing elements cooperatively form the stator ring,
  wherein the first segment and the second segment each comprise a backing portion coupled to the stationary housing and a primary ring portion,
  wherein the primary ring portion is biased towards the rotor ring by at least one spring extending between the backing portion and the primary ring portion.

17. A turbine, comprising:
a rotor;
a stationary housing disposed about the rotor; and
a face seal disposed about the rotor, comprising:
  a rotor ring coupled to or integral with the rotor; and
  a stator ring coupled to the stationary housing, wherein the stator ring comprises:
    a first segment;
    a second segment; and
    at least two bearing elements, wherein the first and second segments are circumferentially split, and the at least two bearing elements are disposed between the first and second segments, and wherein the first segment, the second segment, and the at least two bearing elements cooperatively form the stator ring,
  wherein the first and second segments abut and support one another at two joint interfaces, and the two joint interfaces have L-shaped configurations.

* * * * *